US006834912B2

United States Patent
Cardimen et al.

(10) Patent No.: US 6,834,912 B2
(45) Date of Patent: Dec. 28, 2004

(54) STRUCTURE FOR CONTROLLED DEFORMATION OF BODY SIDE STRUCTURE

(75) Inventors: Peter Cardimen, Powell, OH (US); Robert Zummallen, Marysville, OH (US); Skye Malcolm, Upper Arlington, OH (US); Henry DiCato, Marysville, OH (US); Kerry McClure, Dublin, OH (US); Kengo Ishibashi, Nagasaki (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 10/683,776

(22) Filed: Oct. 10, 2003

(65) Prior Publication Data

US 2004/0075265 A1 Apr. 22, 2004

Related U.S. Application Data

(60) Provisional application No. 60/419,638, filed on Oct. 18, 2002.

(51) Int. Cl.[7] ........................... B62D 21/03; B62D 25/20
(52) U.S. Cl. ......................... 296/204; 296/209; 296/29; 296/187.08
(58) Field of Search ................................ 296/204, 209, 296/187.12, 193.05, 203.01, 203.03, 29, 30, 205, 193.07, 193.06, 187.08

(56) References Cited

U.S. PATENT DOCUMENTS

| | | | | |
|---|---|---|---|---|
| 2,349,940 A | * | 5/1944 | Craig | .................... 296/203.01 |
| 4,572,571 A | | 2/1986 | Malen | |
| 5,102,187 A | | 4/1992 | Harasaki | |
| 5,352,011 A | * | 10/1994 | Kihara et al. | .......... 296/203.03 |
| 5,464,266 A | * | 11/1995 | Guertler | ................ 296/187.12 |
| 5,700,049 A | * | 12/1997 | Shibata | .................. 296/203.03 |
| 5,855,394 A | | 1/1999 | Horton et al. | |
| 6,053,564 A | * | 4/2000 | Kamata et al. | ........ 296/187.09 |
| 6,123,378 A | | 9/2000 | Teply et al. | |
| 6,139,094 A | * | 10/2000 | Teply et al. | ........... 296/203.03 |
| 6,270,153 B1 | * | 8/2001 | Toyao et al. | ................ 296/204 |
| 6,330,778 B1 | | 12/2001 | Jakobsson | |
| 6,382,710 B1 | * | 5/2002 | Funk et al. | ............ 296/187.12 |
| 6,386,625 B1 | * | 5/2002 | Dukat et al. | ................ 296/209 |
| 6,398,260 B1 | | 6/2002 | Rinehart | |
| 6,517,142 B2 | | 2/2003 | Gehringhoff et al. | |
| 6,519,854 B2 | | 2/2003 | Blank | |
| 6,540,286 B2 | * | 4/2003 | Takemoto et al. | .......... 296/204 |
| 6,676,200 B1 | * | 1/2004 | Peng | .......................... 296/204 |
| 6,758,516 B1 | * | 7/2004 | Abramczyk et al. | ... 296/187.12 |
| 2003/0137163 A1 | * | 7/2003 | Hayashi et al. | ............. 296/204 |

* cited by examiner

*Primary Examiner*—D. Glenn Dayoan
*Assistant Examiner*—Greg Blankenship
(74) *Attorney, Agent, or Firm*—Rankin, Hill, Porter & Clark LLP

(57) ABSTRACT

A frame and support assembly for a vehicle lacking a conventional, separate B-pillar includes first and second frame members and a plurality of support assemblies. Each support assembly includes a plurality of bulkheads, a pair of outriggers, and a cross member. The bulkheads are incorporated into first and second side sill assemblies. The outriggers extend between the side sill assemblies and the first and second frame members. The cross members extend between the first and second first frame members. The strength of the bulkheads, outriggers, and cross members is selected such that the cross member is stiffer than the outriggers, and the outriggers are stiffer than the bulkheads so that the support assemblies progressively crush during a side impact.

22 Claims, 4 Drawing Sheets

STRUCTURE FOR CONTROLLED DEFORMATION OF BODY SIDE STRUCTURE

CROSS REFERENCE TO RELATED APPLICATION

This application claims the benefit of priority to U.S. Provisional Application Ser. No. 60/419,638 filed Oct. 18, 2002, which is herein incorporated by reference.

BACKGROUND OF THE INVENTION

1. Field of the Invention

The present invention is generally directed toward vehicle frame assemblies and, more particularly, toward vehicle frame assemblies adapted to withstand side impacts.

2. Description of Related Art

Vehicles conventionally include a frame extending beneath the vehicle body and associated structural supports to which the body panels and vehicle doors are secured. Such conventional structural supports include an A-pillar and a B-pillar. The A-pillar extends upwardly from adjacent the front panel and attaches to a front corner of the vehicle roof. The B-pillar conventionally extends upwardly from the side sill to the roof at a location relatively between the front and rear doors. The rear edge of the front door seals against the B-pillar while the forward edge of the rear door, which is hingedly secured to the B-pillar, also seals against the B-pillar. Recently, however, vehicle body styles have been introduced, wherein a conventional B-pillar is not provided.

In recent years, there has been an increased awareness of the need to provide vehicles with improved protection from side impact collisions. Most efforts to provide such improved protection have been directed toward improving the construction of vehicle doors or B-pillars, or by providing side-mounted air bags. Examples of such efforts are shown in U.S. Pat. Nos. 6,474,721; 6,517,142; and 6,519,854. Some efforts to provide improved protection against side impact collisions, however, have been directed toward strengthening the frame of the vehicle. Examples of such efforts are shown in U.S. Pat. Nos. 5,464,266 and 5,921,618. In new vehicle body styles lacking a conventional B-pillar, it is especially desirable to provide a frame that is better able to absorb side impact collisions. The present invention is directed to such an improved frame.

SUMMARY OF THE INVENTION

The present invention is directed toward an improved progress crush assembly for a vehicle lacking a B-pillar that is particularly useful to absorb side impacts. In accordance with the present invention, a frame and support structure for a vehicle having a longitudinal axis is provided. The frame and support structure includes spaced-apart first and second side sill assemblies and spaced-apart first and second frame members, all of which extend longitudinally. The first and second frame members are disposed between the first and second side sill assemblies. At least one lateral support assembly is provided and includes first and second outriggers and a cross member. The first and second outriggers extend between the first side sill assembly and the first frame member, and the second outrigger extends between the second side sill assembly and the second frame member. The cross member extends between the first and second frame members. The support assembly is adapted to provide progressive energy-absorbing characteristics, which are desirable to control the deformation of the vehicle during a side impact. More specifically, the support assembly is adapted to permit the vehicle to deform progressively from the outside toward the inside, while the inside portion of the support assembly is selected to have a strength sufficient to resist deformation. In accordance with the present invention, the components of the support assembly have different degrees or levels of strength or stiffness to progressively absorb crash energy. The side sill assembly, and the bulkheads incorporated therein, have the least strength and therefore are first to deform and absorb energy during a crash. The outrigger is stronger than the side sill assembly and bulkheads, and is next to deform and absorb energy. The cross-member and frame have the greatest relative strength, and are generally most resistant to deformation. It is desirable that the area of the cross-member not be crushed at all.

BRIEF DESCRIPTION OF THE DRAWINGS

These and further features of the invention will be apparent with reference to the following description and drawings, wherein.

DETAILED DESCRIPTION OF THE PREFERRED EMBODIMENTS

Initially it is noted that the drawings referred to hereinafter as illustrating the preferred embodiments of the present invention are not to scale and are schematic in nature and, therefore, should not be taken too literally. Nevertheless, the drawings illustrate the invention sufficiently to enable one skilled in the art to practice the invention.

Figure 1:
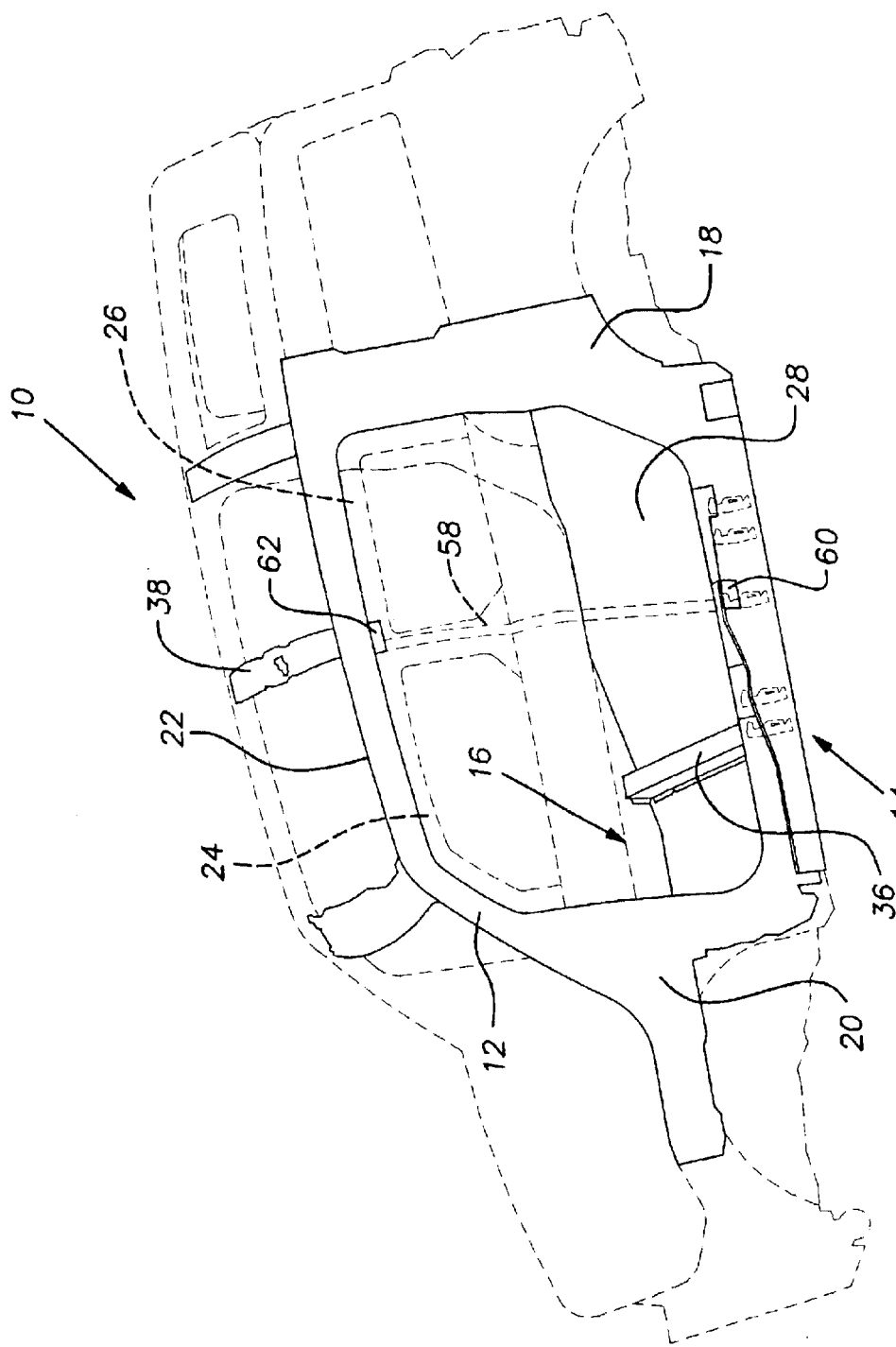
FIG. 1 is schematic perspective view of portions of a vehicle incorporating an improved support assembly according to the present invention.
Figure 2:
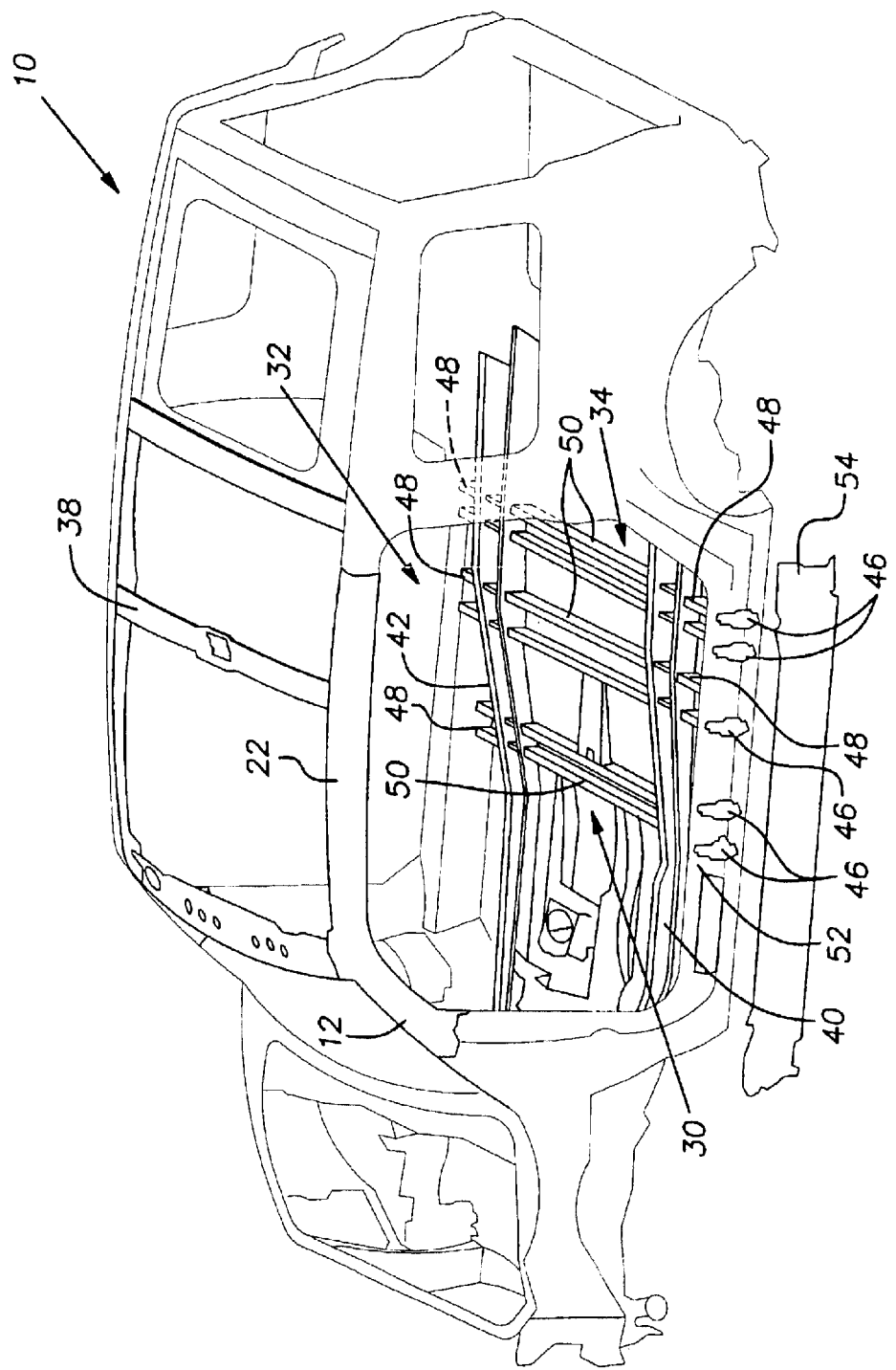
FIG. 2 is a schematic, partially exploded, perspective view of portions of a vehicle incorporating the improved support assembly according to the present invention, with the vehicle floor removed for purposes of clarity.

With reference to FIGS. 1–2, a vehicle body 10 incorporating a frame and support assembly according to the present invention is illustrated. Each side of the vehicle body 10 includes an A-pillar 12, a side sill assembly 14, 16, a rear body panel 18, a front body panel 20, and a top beam 22 that cooperate to define an enlarged door opening. A front door 24 and a rear door 26 are shown in phantom in FIG. 1. Preferably, the front door 24 is hingedly or pivotally secured to the front body panel 20 while the rear door 26 is hingedly or pivotally secured adjacent the rear body panel 22. When the front and rear doors 24, 26 are closed, the rearward edge of the front door 24 preferably overlaps the forward edge of the rear door 26. When the front and rear doors 24, 26 are open, the entire enlarged door opening is available for ingress and egress to and from the vehicle passenger compartment.

With further reference to FIG. 1, a vehicle floor 28 is shown, as well as portions of a front, mid, and rear support assemblies 30, 32, 34. The vehicle floor 28 overlies other portions of the frame and support structure that are not shown in FIG. 1, but rather are illustrated in subsequently-described drawing figures. The front support assembly 30 is preferably disposed about mid-way along the length of the front door 24 when the front door 24 is closed, and includes an upper beam member 36 that extends between, and is secured to, the first and second side sill assemblies 14, 16 located on opposite sides of the vehicle, as illustrated. The mid support assembly 32 is preferably disposed about at the joint or union of the front and rear doors 24, 26, and extends across the width of the vehicle. Similarly, the rear support assembly 34 is preferably disposed at about midway along the length of the rear door 26 when the rear door 26 is closed, and extends across the entire width of the vehicle. Also illustrated in FIG. 1 is a roof arch 38 that is generally aligned with the mid support assembly 32. The roof arch 38 extends between, and interconnects, the top beams 22 overlying the door openings. As will be described more fully hereinafter, the roof arch 38 cooperates with the support assemblies 30, 32, 34 to absorb energy delivered to the vehicle during a side impact.

Figure 3:
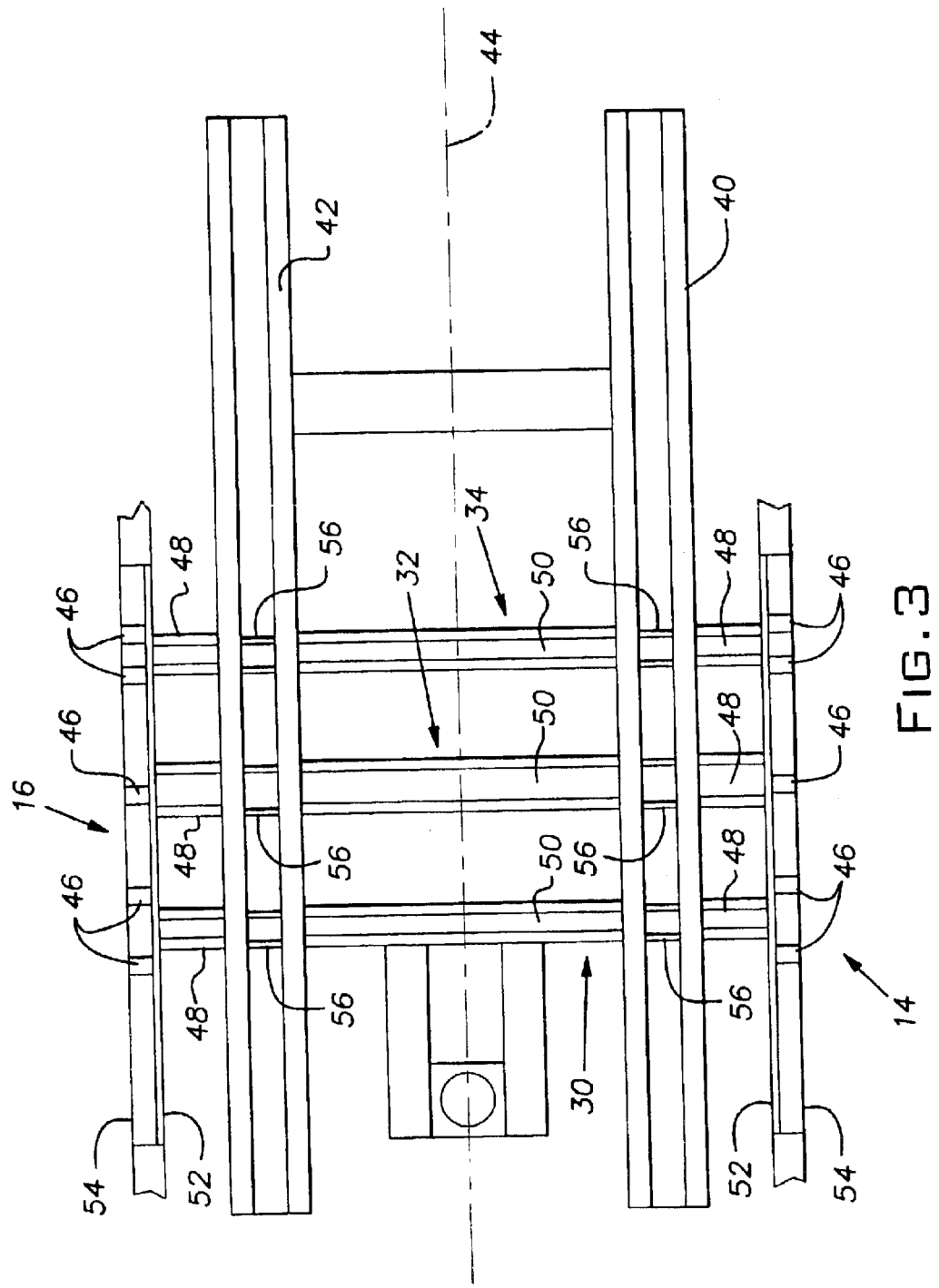
FIG. 3 is a top schematic view of a frame assembly incorporating the support assemblies of the present invention.

With reference to FIGS. 2 and 3, the vehicle frame and support structure according to the present invention is illustrated. The frame and support structure includes first and second generally U-shaped frame members 40, 42 that extend longitudinally in the vehicle at laterally spaced-apart locations. Preferably, the frame members 40, 42 have upwardly directed arms that are interconnected by a generally horizontal base member so as to define an upwardly open channel-like structure. Also, as will be appreciated from the drawings, the frame and support structure is generally symmetrical as viewed about a longitudinal centerline or axis 44 of the vehicle.

The first frame member 40 is disposed on a first side of the vehicle axis 44 so as to be relatively closer to the first side sill assembly 14. Similarly, the second frame member 42 is disposed on an opposite or second side of the vehicle axis 44 so as to be relatively closer to a second side sill assembly 16.

Each of the front, mid, and rear support assemblies 30, 32, 34 include a plurality of bulkheads 46, a pair of outriggers 48, and a cross member 50 that cooperate to transfer energy from the side sill assemblies toward the frame members 40, 42, as will be described more fully hereinafter. The bulkheads 46 of the support assemblies are incorporated into the first and second side sill assemblies 14, 16.

Figure 4:
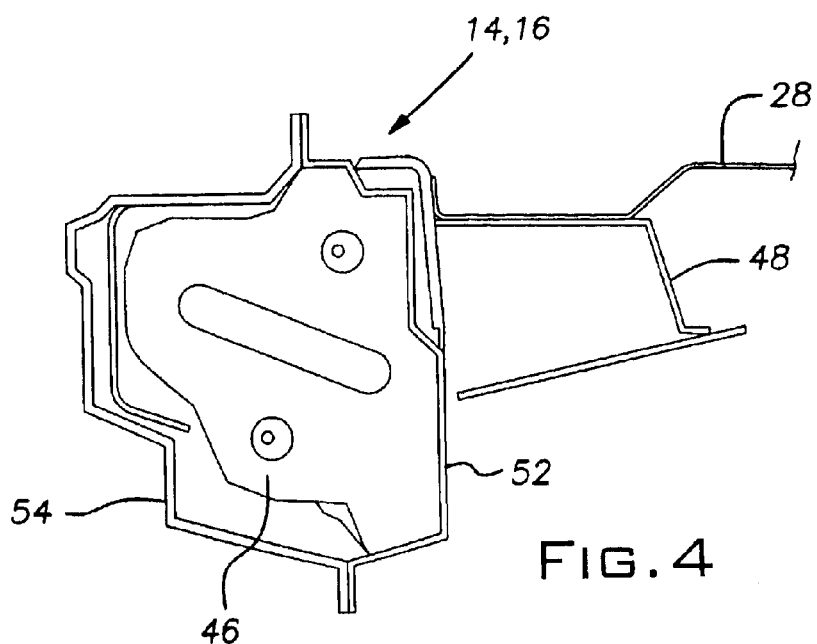
FIG. 4 is a cross-sectional view of a side sill assembly and outrigger according to the present invention; and, FIG. 5 schematically illustrates force transfer in a vehicle incorporating the support assembly of the present invention.

More specifically, the first and second side sill assemblies 14, 16 are generally identical to one another, and each includes a first or inner elongated side sill member 52 and a second or outer elongated side sill member 54 mated to the first side sill member 52. A hollow area is defined between the first and second elongated side sill members 52, 54. The bulkheads 46 of the front, mid, and rear support assemblies 30, 32, 34 are disposed within the hollow area of the side sill assemblies 14, 16. The bulkheads 46 are secured to, extend between, and interconnect the inner and outer side sill members 52, 54 and, therefore, are oriented generally transverse to the vehicle axis 44. As shown in FIGS. 2 and 4, each of the bulkheads 46 has a generally planar body portion that substantially fills the cross-section of the hollow area of its respective side sill assembly 14 or 16. One or more ribs may be formed in the body portion of each bulkhead 46 to rigidify the body portion. For more information related to side sill assemblies and bulkheads, reference should be made to commonly-assigned U.S. patent application Ser. No. 10/683,777, filed Oct. 10, 2003, the disclosure of which is expressly incorporated herein in its entirety.

In the illustrated and preferred embodiment, each end of the front support assembly 30 includes a pair of bulkheads 46 disposed between the outer side sill member 54 and the inner side sill member 52. Similarly, each end of the mid support assembly 32 includes a single bulkhead 46 between the inner and outer side sill members 52, 54, and each end of the rear support assembly 34 includes a pair of bulkheads 46 disposed between the inner and outer side sill members 52, 54. The bulkheads 46 serve to stiffen the side sill assemblies 14,16, and to transfer energy from the outer side sill members 54 to the inner side sill members 52 and, ultimately, to the outriggers 48, frame members 40, 42, and cross member 50, as will be apparent from the following description.

The outriggers 48 extend between the inner side sill member 52 and the associated first or second frame member 40, 42 and are oriented in a direction generally transverse to the vehicle axis 44 and the frame members 40, 42 and generally parallel to the bulkhead 46. The outriggers 48 are preferably generally U-shaped in cross section, having upwardly-directed arms that are connected to one another by a base wall at a lower end thereof. Ends of the outriggers 48 are secured to the associated frame member 40, 42 and inner side sill member 52 by conventional mechanical techniques, including welding and mechanical fasteners, as appropriate. If desired, the outrigger ends may include outwardly extending wings or flanges that would abut and/or overlie portions of the associated frame member 40, 42 and inner side sill member 52 so as facilitate attachment thereto.

The support assemblies' cross members 50 extend between and interconnect the first and second frame members 40, 42. The cross members 50 are preferably U-shaped in cross section so as to have a pair of upstanding arms that are interconnected at their bottom ends by a base member. Ends of the cross members 50 are secured to the associated frame member 40, 42 by conventional mechanical techniques, including welding and mechanical fasteners, as appropriate. If desired, the cross member ends may include outwardly extending wings or flanges that would abut and/or overlie portions of the frame members 40, 42 so as facilitate attachment thereto.

The first and second frame members 40, 42, as described hereinbefore, are generally U-shaped in cross section and extend generally parallel to the vehicle axis 44. At locations aligned with the cross members 50, the first and second frame members receive braces 56 between their upstanding arms. The braces 56 help to reinforce the frame members 40, 42 and to transfer forces from one frame member arm to the other frame member arm.

As illustrated in the drawings, the bulkheads 46, outriggers 48, and cross member 50 for each of the support assemblies 30, 32, 34 are aligned with one another transverse to the vehicle axis 44, and define load paths through which forces may be communicated when the vehicle experiences a side impact. While these load paths communicate forces inwardly from the outer portions of the vehicle, the strength or stiffness of the components of the support assemblies are designed to deform or crush in a predetermined and controlled fashion so that the innermost portions of the frame and support structure, namely the frame members 40, 42 and cross members 50, will ordinarily retain their structural integrity and remain undeformed in a crash.

More specifically, the components of the support assemblies 30, 32, 34 are designed to have relatively different stiffnesses or strengths so as to provide a progressive, controlled crushing function during a side impact. More specifically, the bulkheads 46, and the side sill assemblies 14, 16 into which they are incorporated, are relatively weaker or less stiff as compared to the outriggers 48, while the outriggers 48 are relatively weaker or less stiff as compared to the frame members 40, 42 and the cross members 50. Accordingly, during a relatively low-speed side impact, the bulkheads 48 and first and second side sill members 52, 54 may buckle or crush, while the outriggers 48, frame members 40, 42, and cross members 50 will be unaffected. In a moderate speed side impact, the bulkheads 46, side sill assemblies 12, 14, and outriggers 48 will deform, while the frame members 40, 42 and the cross members 50 will be unaffected. As will be appreciated by those skilled in the art, the position and strength of the cross members 50 serve to share the crash energy that is not absorbed by the bulkheads 46 and outriggers 48 between the first and second frame members 40, 42, and will only be deformed or affected in the most serious or highest-energy side impacts.

Figure 5:
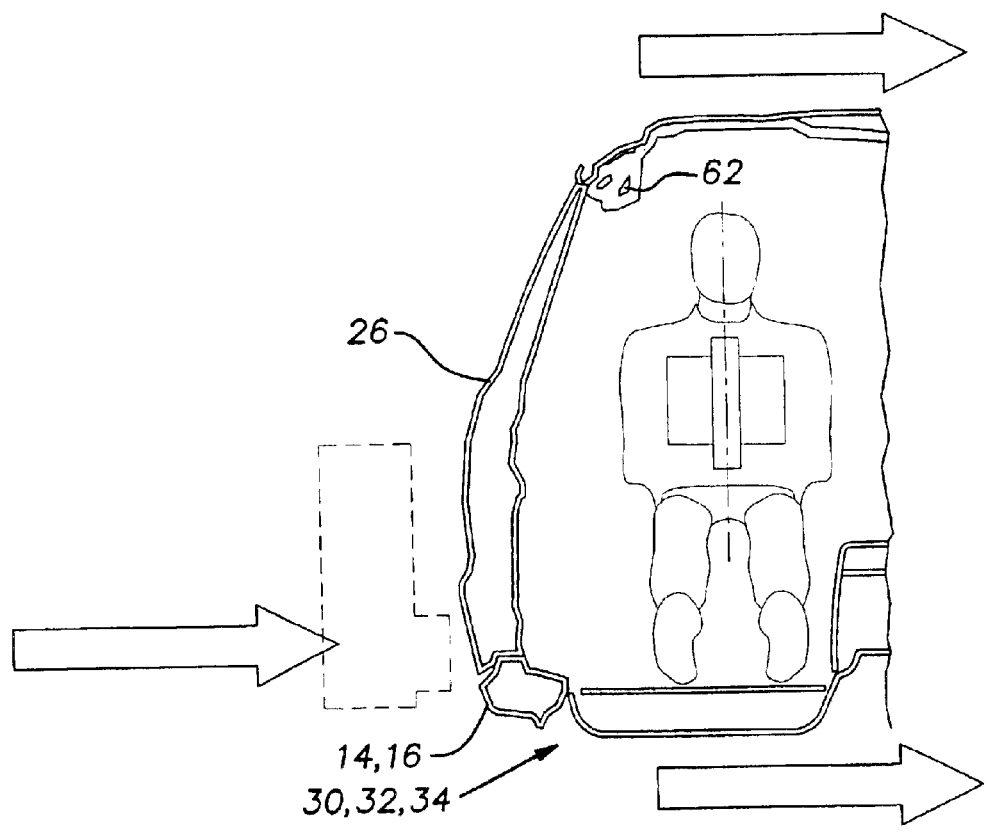

In order to facilitate transfer of loads between the first and second side sill assemblies 14, 16, the support assemblies 30, 32, 34, and the roof arch 38, the rear door 26 preferably includes a vertically oriented beam 58 adjacent its forward edge. Upper and lower latching assemblies 60, 62 disposed at upper and lower ends of the rear door beam 58 interconnect the rear door beam 58 with the associated side sill assembly 14, 16 and the top beam 22, respectively. Accordingly, during a side impact, the rear door beam 58 serves as a load path that distributes a portion of the energy to the roof arch 38, thereby reducing the load that must be born by the frame members 40, 42 and support assemblies 30, 32, 34, described hereinbefore. In this regard, the rear door beam 58 together with the upper and lower latching assemblies 60, 62 may be considered to be a substitute for the conventional B-pillar. This energy transfer and distribution is illustrated schematically in FIG. 5.

It is noted that the height of the frame members 40, 42 varies over their length. More specifically, the frame members have a reduced height portion at a forward end thereof. This reduction in height facilitates placement of the front support assembly top beam member 36 over the vehicle floor 28, as illustrated in FIG. 1. As set forth above, the vehicle floor 28 is disposed over the outriggers 48 and the cross members 50 of the support assemblies, as well as the first and second frame members 40, 42.

While the preferred embodiments of the present invention have been described with particularity herein, it is considered apparent that the present invention is capable of numerous modifications, replacements, and substitutions of parts and, therefore, is not to be limited to the structure specifically described and illustrated. Rather, the present invention is only to be defined by the claims appended hereto, including equivalents thereof.

What is claimed is:

1. A frame and support structure for a vehicle having a longitudinal axis, said frame and support structure comprising:

spaced-apart first and second side sill assemblies extending generally parallel to the longitudinal axis of the vehicle;

spaced-apart first and second frame members extending generally parallel to the longitudinal axis of the vehicle, said first and second frame members being disposed between the first and second side sill assemblies; and, at least one lateral support assembly that includes:

first and second outriggers, said first outrigger extending between the first side sill assembly and the first frame member, and said second outrigger extending between the second side sill assembly and the second frame member; and a cross member extending between the first and second frame members; and wherein the stiffness of the first and second outriggers and the stiffness of the cross member are selected such that the cross member is stiffer than the first and second outriggers.

2. The frame and support structure according to claim 1, wherein opposing ends of the cross member are secured to the first and second frame members, respectively, and wherein opposing ends of the first outrigger are secured to the first side sill assembly and the first frame member, respectively, and wherein opposing ends of the second outrigger are secured to the second side sill assembly and the second frame member, respectively.

3. The frame and support structure according to claim 2, wherein the at least one lateral support assembly further comprises a first bulkhead disposed in the first side sill assembly and a second bulkhead disposed in the second side sill assembly.

4. The frame and support structure according to claim 3, wherein the first outrigger is stiffer than the first bulkhead and the second outrigger is stiffer than the second bulkhead.

5. The frame and support structure according to claim 4, wherein the cross member is aligned with the first and second outriggers.

6. The frame and support structure according to claim 5, wherein each of the first and second frame members is generally U-shaped and includes a pair of spaced-apart arms, between which are disposed a pair of braces that are aligned with the cross member.

7. The frame and support structure according to claim 4, wherein the first and second side sill assemblies each comprise inner and outer side sill members with a hollow area defined therebetween, and wherein the first bulkhead is secured between the inner and outer side sill members of the first side sill assembly and the second bulkhead is secured between the inner and outer side sill members of the second side sill assembly.

8. The frame and support structure according to claim 4, wherein the at least one lateral support assembly comprises front, mid and rear support assemblies.

9. The frame and support structure according to claim 8, wherein the front and rear support assemblies each further comprise a third bulkhead disposed proximate to, but spaced from, the first bulkhead, and a fourth bulkhead disposed proximate to, but spaced from, the second bulkhead.

10. The frame and support structure according to claim 4, wherein the first and second outriggers and the cross member each have a generally U-shaped cross-section, and wherein the first and second bulkheads each have a generally planar body.

11. A vehicle having a longitudinal axis, said vehicle comprising:

front and rear doors, each of which is movable between open and closed positions;

spaced-apart first and second side sill assemblies disposed below the front and rear doors and extending generally parallel to the longitudinal axis of the vehicle;

spaced-apart first and second frame members extending generally parallel to the longitudinal axis of the vehicle, said first and second frame members being disposed between the first and second side sill assemblies; and, at least one lateral support assembly that includes:

first and second outriggers, said first outrigger extending between the first side sill assembly and the first frame member, and said second outrigger extending between the second side sill assembly and the second frame member; and a cross member extending between the first and second frame members; and wherein the stiffness of the first and second outriggers and the stiffness of the cross member are selected such that the cross member is stiffer than the first and second outriggers.

12. The vehicle according to claim 11, wherein opposing ends of the cross member are secured to the first and second frame members, respectively, and wherein opposing ends of the first outrigger are secured to the first side sill assembly and the first frame member, respectively, and wherein opposing ends of the second outrigger are secured to the second side sill assembly and the second frame member, respectively.

13. The vehicle according to claim 12, wherein the at least one lateral support assembly further comprises a first bulkhead disposed in the first side sill assembly and a second bulkhead disposed in the second side sill assembly.

14. The vehicle according to claim 13, wherein the first outrigger is stiffer than the first bulkhead and the second outrigger is stiffer than the second bulkhead.

15. The vehicle according to claim 14, wherein the cross member is aligned with the first and second outriggers.

16. The vehicle according to claim 15, wherein each of the first and second frame members is generally U-shaped and includes a pair of spaced-apart arms, between which are disposed a pair of braces that are aligned with the cross member.

17. The vehicle according to claim 14, wherein the first and second side sill assemblies each comprise inner and outer side sill members with a hollow area defined therebetween, and wherein the first bulkhead is secured between the inner and outer side sill members of the first side sill assembly and the second bulkhead is secured between the inner and outer side sill members of the second side sill assembly.

18. The vehicle according to claim 14, wherein the at least one lateral support assembly comprises front, mid and rear support assemblies.

19. The vehicle according to claim 18, wherein the front and rear support assemblies each further comprise a third bulkhead disposed proximate to, but spaced from, the first bulkhead, and a fourth bulkhead disposed proximate to, but spaced from, the second bulkhead.

20. The vehicle according to claim 14, wherein the first and second outriggers and the cross member each have a generally U-shaped cross-section, and wherein the first and second bulkheads each have a generally planar body.

21. The vehicle according to claim 11, wherein the front and rear doors are disposed on one side of the longitudinal axis of the vehicle, and wherein the vehicle further comprises a front body panel disposed forward of the front door, a rear body panel disposed rearward of the rear door and a top beam disposed above the front and rear doors, and wherein the front body panel, the rear body panel and the top beam cooperate to help define an enlarged door opening.

22. The vehicle according to claim 21, wherein the front door is pivotally secured to the front body panel and the rear door is pivotally secured to the rear body panel, and wherein when the front and rear doors are in the open positions, the enlarged door opening is available for ingress and egress to and from the vehicle, respectively.

* * * * *